US 9,856,788 B2
United States Patent
Guinther

(10) Patent No.: US 9,856,788 B2
(45) Date of Patent: Jan. 2, 2018

(54) AIRBORNE ENGINE ADDITIVE DELIVERY SYSTEM

(71) Applicant: Afton Chemical Corporation, Richmond, VA (US)

(72) Inventor: Gregory Guinther, Richmond, VA (US)

(73) Assignee: AFTON CHEMICAL CORPORATION, Richmond, VA (US)

(*) Notice: Subject to any disclaimer, the term of this patent is extended or adjusted under 35 U.S.C. 154(b) by 0 days.

(21) Appl. No.: 15/279,941

(22) Filed: Sep. 29, 2016

(65) Prior Publication Data

US 2017/0082019 A1 Mar. 23, 2017

Related U.S. Application Data

(63) Continuation of application No. 14/343,414, filed as application No. PCT/US2012/042727 on Jun. 15, 2012, now Pat. No. 9,458,761.

(Continued)

(51) Int. Cl.
*F02B 43/00* (2006.01)
*F02B 43/04* (2006.01)
(Continued)

(52) U.S. Cl.
CPC .............. *F02B 43/04* (2013.01); *C10L 1/182* (2013.01); *C10L 1/1811* (2013.01);
(Continued)

(58) Field of Classification Search
CPC ... F02B 1/04; F02B 43/10; F02B 3/06; F02M 25/00; F02D 19/08
(Continued)

(56) References Cited

U.S. PATENT DOCUMENTS 3,790,352 A 2/1974 Niimi et al.
4,255,158 A * 3/1981 King .................. C10L 1/00
44/451

(Continued)

FOREIGN PATENT DOCUMENTS

CN 1154999 C 6/2004
CN 201391378 Y 1/2010
(Continued)

OTHER PUBLICATIONS

International Preliminary Report on Patentability; dated Sep. 6, 2012 for related PCT Application No. PCT/US2012/042727.
(Continued)

*Primary Examiner* — Jacob Amick
*Assistant Examiner* — Charles Brauch
(74) *Attorney, Agent, or Firm* — Mendelsohn Dunleavy, P.C.

(57) ABSTRACT

A method of introducing additives to an air intake system of an engine in order to overcome one or more of the various problems created by formulation of additives in fuels. The method controls at least one of the amount, aerosol particle size and timing of introduction of additives based on information relevant to operation of the engine. The introduced additives form an air-additive mixture and are carried by the airflow in the air-intake system to the combustion chamber of the engine. Another aspect of the invention is an additive introduction system that includes one or more containers for additives, a control system for determining at least one of the amount, aerosol particle size and timing of introduction of the additives, and a device to introduce the additives into the air intake system under the control of the control system.

20 Claims, 5 Drawing Sheets

Related U.S. Application Data

Figure 1:
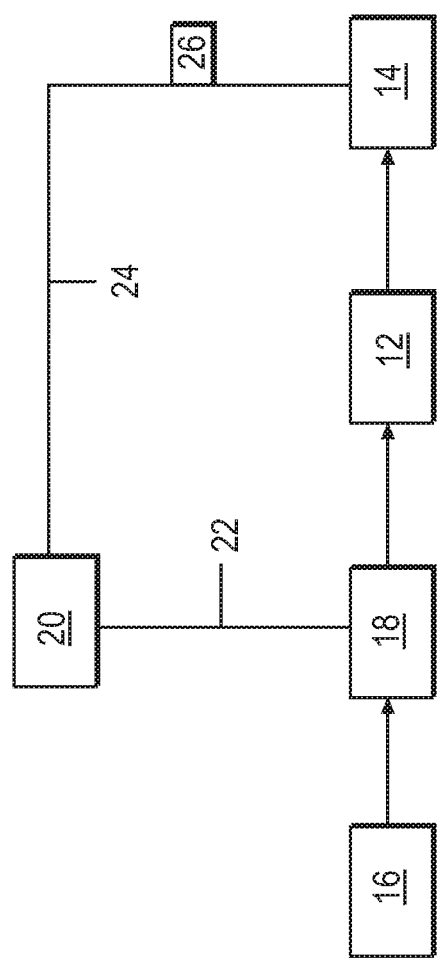

(60) Provisional application No. 61/531,717, filed on Sep. 7, 2011.

(51) Int. Cl.

| | |
|---|---|
| *C10L 10/00* | (2006.01) |
| *C10L 1/18* | (2006.01) |
| *C10L 1/182* | (2006.01) |
| *C10L 1/185* | (2006.01) |
| *C10L 1/223* | (2006.01) |
| *C10L 1/23* | (2006.01) |
| *C10L 1/30* | (2006.01) |
| *F02B 43/02* | (2006.01) |
| *F02M 35/10* | (2006.01) |
| *F02M 25/00* | (2006.01) |
| *F02D 19/12* | (2006.01) |
| *F02D 41/00* | (2006.01) |
| *F02M 25/14* | (2006.01) |
| *F02B 1/04* | (2006.01) |
| *F02B 3/06* | (2006.01) |
| *F02D 19/08* | (2006.01) |
| *F02B 43/10* | (2006.01) |
| *F02D 41/02* | (2006.01) |

(52) U.S. Cl.
CPC ............ *C10L 1/1857* (2013.01); *C10L 1/223* (2013.01); *C10L 1/231* (2013.01); *C10L 1/305* (2013.01); *C10L 10/00* (2013.01); *F02B 43/02* (2013.01); *F02D 19/12* (2013.01); *F02D 41/0025* (2013.01); *F02M 25/00* (2013.01); *F02M 25/14* (2013.01); *F02M 35/10209* (2013.01); *C10L 2230/22* (2013.01); *C10L 2270/023* (2013.01); *C10L 2270/026* (2013.01); *F02B 1/04* (2013.01); *F02B 3/06* (2013.01); *F02B 43/10* (2013.01); *F02D 19/08* (2013.01); *F02D 41/021* (2013.01); *F02D 2200/701* (2013.01); *F02D 2200/702* (2013.01)

(58) Field of Classification Search
USPC ........................................................ 123/1 A
See application file for complete search history.

(56) References Cited

U.S. PATENT DOCUMENTS

| | | | |
|---|---|---|---|
| 4,286,550 A | 9/1981 | Lewis | |
| 4,377,135 A | 3/1983 | Abthoff et al. | |
| RE31,218 E | 4/1983 | Hicks et al. | |
| 4,580,550 A * | 4/1986 | Kristen | F24C 3/067 126/39 H |
| 5,247,909 A * | 9/1993 | Simmons | F02B 41/00 123/1 A |
| 5,282,445 A | 2/1994 | Markou | |
| 5,327,861 A | 7/1994 | Rogalla et al. | |
| 5,438,966 A | 8/1995 | Teegen | |
| 5,662,071 A | 9/1997 | Robinson | |
| 5,826,602 A | 10/1998 | Chen | |
| 6,152,099 A | 11/2000 | Urich | |
| 6,258,133 B1 | 7/2001 | Cherpeck | |
| 6,341,111 B1 | 1/2002 | Oh | |
| 6,523,530 B2 | 2/2003 | Evert et al. | |
| 6,789,511 B2 | 9/2004 | Hertweck et al. | |
| 7,047,748 B2 | 5/2006 | Zauderer | |
| 7,063,819 B2 | 6/2006 | Rosocha | |
| 7,066,132 B1 * | 6/2006 | Verbrugge | F02B 77/04 123/193.6 |
| 7,134,405 B2 | 11/2006 | Vincent et al. | |
| 7,146,938 B2 | 12/2006 | Sundholm | |
| 7,284,507 B2 | 10/2007 | Sundholm | |
| 7,428,890 B2 | 9/2008 | Lay et al. | |
| 7,461,632 B2 | 12/2008 | Raimann et al. | |
| 7,493,886 B2 | 2/2009 | Blank | |
| 7,762,233 B2 | 7/2010 | Cohn et al. | |
| 7,846,224 B2 | 12/2010 | Colucci et al. | |
| 8,468,982 B2 | 6/2013 | Johnson et al. | |
| 2002/0177942 A1 | 11/2002 | Knaian et al. | |
| 2003/0154646 A1 | 8/2003 | Hazarika et al. | |
| 2004/0065002 A1 | 4/2004 | Hu | |
| 2004/0103859 A1 | 6/2004 | Shetley | |
| 2005/0055874 A1 | 3/2005 | Bekemeyer | |
| 2005/0066576 A1 | 3/2005 | Morris et al. | |
| 2005/0217638 A1 * | 10/2005 | Kaneko | F02M 25/00 123/294 |
| 2007/0080583 A1 | 4/2007 | Noumura et al. | |
| 2007/0175459 A1 | 8/2007 | Williams et al. | |
| 2007/0209607 A1 * | 9/2007 | Williams | F02D 19/12 123/1 A |
| 2007/0227503 A1 | 10/2007 | Hitomi et al. | |
| 2007/0245719 A1 | 10/2007 | Driscoll | |
| 2008/0076685 A1 * | 3/2008 | Macpherson | C10M 159/18 508/150 |
| 2008/0086936 A1 | 4/2008 | Cunningham et al. | |
| 2008/0223330 A1 | 9/2008 | Lam et al. | |
| 2008/0271705 A1 * | 11/2008 | Sims | F01L 9/021 123/435 |
| 2009/0197758 A1 * | 8/2009 | Bancheri | C04B 35/50 501/152 |
| 2009/0216423 A1 | 8/2009 | Forti et al. | |
| 2009/0288337 A1 | 11/2009 | Picataggio et al. | |
| 2009/0313888 A1 | 12/2009 | Theaker | |
| 2010/0228400 A1 | 9/2010 | Johnson et al. | |
| 2011/0179697 A1 | 7/2011 | Shabanov et al. | |

FOREIGN PATENT DOCUMENTS

| | | |
|---|---|---|
| CN | 102153596 A | 8/2011 |
| DE | 102006007855 A1 | 8/2007 |
| EP | 0537931 A1 | 4/1993 |
| EP | 1057880 A2 | 12/2000 |
| JP | S4812207 | 2/1973 |
| JP | 5639850 A | 4/1980 |
| JP | 58051256 A | 3/1983 |
| JP | 58057061 A | 4/1983 |
| JP | 61170426 | 8/1986 |
| JP | 03275914 A | 12/1991 |
| JP | 05214351 A | 8/1993 |
| JP | 08117173 A | 5/1996 |
| JP | 2001019981 A | 1/2001 |
| JP | 2001271672 A | 10/2001 |
| JP | 2007099207 A | 4/2007 |
| JP | 2008536043 A | 9/2008 |
| JP | 2009185618 A | 8/2009 |
| RU | 2055232 C1 | 2/1996 |
| RU | 2177073 C2 | 12/2001 |
| RU | 2182163 C2 | 5/2002 |
| RU | 2188329 C1 | 8/2002 |
| SU | 1442617 A1 | 12/1988 |
| WO | WO9727395 A1 | 7/1997 |
| WO | WO03072912 A1 | 9/2003 |
| WO | WO2004025108 A1 | 3/2004 |
| WO | WO2005045206 A2 | 5/2005 |
| WO | WO2006108076 | 10/2006 |
| WO | WO2007141585 A1 | 12/2007 |
| WO | WO2008049224 A1 | 5/2008 |
| WO | WO2013036311 A1 | 3/2013 |

OTHER PUBLICATIONS

Chinese Office Action; dated Nov. 4, 2015 for CN Application No. 201280054666.
Japanese Notice of Reasons for Rejection; dated Jan. 6, 2016 for JP Application No. JP2014-529711.
European Search Report; dated Nov. 11, 2015 for EP Application No. 12830494.6.
European Office Action; dated Jan. 2, 2017 for EP Application No. 12830494.6.
Chinese Office Action; dated Oct. 10, 2016 for CN Application No. CN201280054666.

(56) References Cited

OTHER PUBLICATIONS

Japanese Notice of Reasons for Rejection; dated Nov. 15, 2016 for JP Application No. JP2014-529711.
MX Office Action and English Summary; dated May 11, 2017 for MX Application No. MX/a/2014/002729.
CN Office Action; dated May 5, 2017 for CN Application No. CN201280054666.4.

* cited by examiner

AIRBORNE ENGINE ADDITIVE DELIVERY SYSTEM

RELATED APPLICATION DATA

This application is a continuation of U.S. patent application Ser. No. 14/343,414, filed Jun. 17, 2014, which claims priority to International Application No. PCT/US 12/42727, filed Jun. 15, 2012, and U.S. Provisional Application No. 61/531,717, filed Sep. 7, 2011, the entire disclosure of which is hereby incorporated by reference as if set forth fully herein.

BACKGROUND OF THE INVENTION

1. Field of the Invention

The present invention is directed to methods and systems for introducing additives to the combustion chamber of an engine via the air-intake system.

2. Description of the Related Technology

Additives are traditionally added to fuel before the fuel is pumped into fuel tanks of vehicles or other devices. An additive package formulated in this manner commonly experiences a full range of environmental conditions over an extended storage period. The fuel/additive mixture must remain essentially homogeneous throughout the transport, handling and storage period and thus must be formulated to endure extreme heat and cold, varying levels of humidity, etc. Further, the additive package must deliver a wide variety of components, which must be compatible with each other in order to be formulated in the fuel. Further, some additives may cause harm to fuel tanks or the fuel delivery system, e.g. damage to seals and gaskets. These problems often place significant constraints on an additive destined for use in fuel.

Other limitations on formulation of fuel additives also exist. For example, fuel formulators may not want to include certain additives in a particular fuel due to the increased cost of the fuel as a result of including the additive. Further, fuel formulators may introduce their own components into a fuel or particular fuels may contain potentially reactive species raising further compatibility problems for introduction of other additives which may potentially react with such components. For example, fuels may contain reactive species such as ethanol, ethers, fatty acid esters, acidic corrosion inhibitors, drag-reducing polymers, phenol antioxidants, wax anti-settling additives, cloud point reducers, aromatic amines, organic nitrates, organometallic octane enhancers and reactive dienes, thiophenes, peroxides and polynuclear aromatics. Also, additives can be rejected by fuel formulators when the desired treat rate in the fuel exceeds the capacity of the fuel additive addition systems located at a fuel terminal.

As discussed above, some very desirable additives are less than optimal when used in fuel additive formulations. These fuel additives or blend agents have yet to realize their full potential. Some examples of such restrictions are discussed for example in U.S. Pat. No. 7,846,224 where it is indicated that some friction modifiers may be incompatible with, or insoluble in the fuel or other additives likely to be in the fuel at low temperature. Wax-like materials are excellent friction modifiers, but have limited solubility in fuels.

There are some known methods that involve the introduction of certain compositions into the air-intake system of engines. Examples of such methods can be found, for example, in U.S. Pat. Nos. 4,377,135; 7,146,938; 5,282,445; 6,152,099; and 6,523,530.

These prior art methods are, for the most part, not directed to solving or avoiding the compatibility or solubility problems that may be encountered when formulating fuel additives into a fuel. In addition, the control mechanisms used in many of these prior art methods suffer from significant drawbacks and thus are not generally suitable for controlling the amount, aerosol particle size and/or timing of the additives being introduced into air-intake system in order to provide the most benefit.

SUMMARY OF THE INVENTION

In a first aspect, the present invention is directed to the introduction of additives to an air intake system of an engine. The method determines the amount, aerosol particle size and/or timing of introduction of the additives. Introduced additives are carried by the airflow in the air-intake system to the combustion chamber of the engine where the additives are mixed with the fuel and combusted. These additives may improve the performance of the engine or provide other beneficial effects as a result of the method.

In one aspect, the amount, aerosol particle size and/or timing of addition of said at least one additive is determined based on information selected from type of fuel, upcoming road conditions, octane number, cetane number, air-fuel ratio, climate conditions, elevation, engine load, oil pressure, wheel speed, mass airflow speed, engine cleanliness, emission levels, oxygen content of air, manifold vacuum pressure, tire pressure, user input, driver characteristics, valve timing, particulate trap light-off, hybrid powertrain strategy, technician input and any combination thereof.

In another aspect, the additive is introduced to the combustion chamber of an engine through the engine's air-intake system for a purpose selected from scavenging, friction modification, friction reduction, improving fuel economy, altering octane number, altering cetane number, ignition retardation, ignition acceleration, deposit reduction, detergency, cleaning, acid neutralization, engine cold start improvement, influencing lube drain interval, antioxidancy, oil additive replenishment, peroxide reduction in a fuel/air-additive mixture in the combustion chamber, corrosion inhibition, anti-settling, cloud point reduction, anti-wear, knock reduction and combinations thereof.

Another aspect of the present invention is the provision of an additive introduction system that comprises at least one container for housing one or more additives, a control system for controlling the amount, aerosol particle size and/or timing of introduction of the one or more additives, and a device to introduce the one or more additives into an air intake system of an engine.

BRIEF DESCRIPTION OF THE DRAWINGS

FIG. 1 depicts an exemplary additive introduction system in accordance with the invention for introduction of one or more additives to the air intake system of an engine.

FIG. 2 depicts an alternative embodiment of the invention wherein two or more additives are fed to the air intake system.

FIG. 3 depicts the results at 600 to 1500 rpm for a Motored Engine Friction Test (also referred to as a "Spin-Master test") with airborne additive fed to a non-fired engine.

FIG. 4 depicts the US EPA FTP-75 City Driving Cycles used in Example 5.

Figure 5:
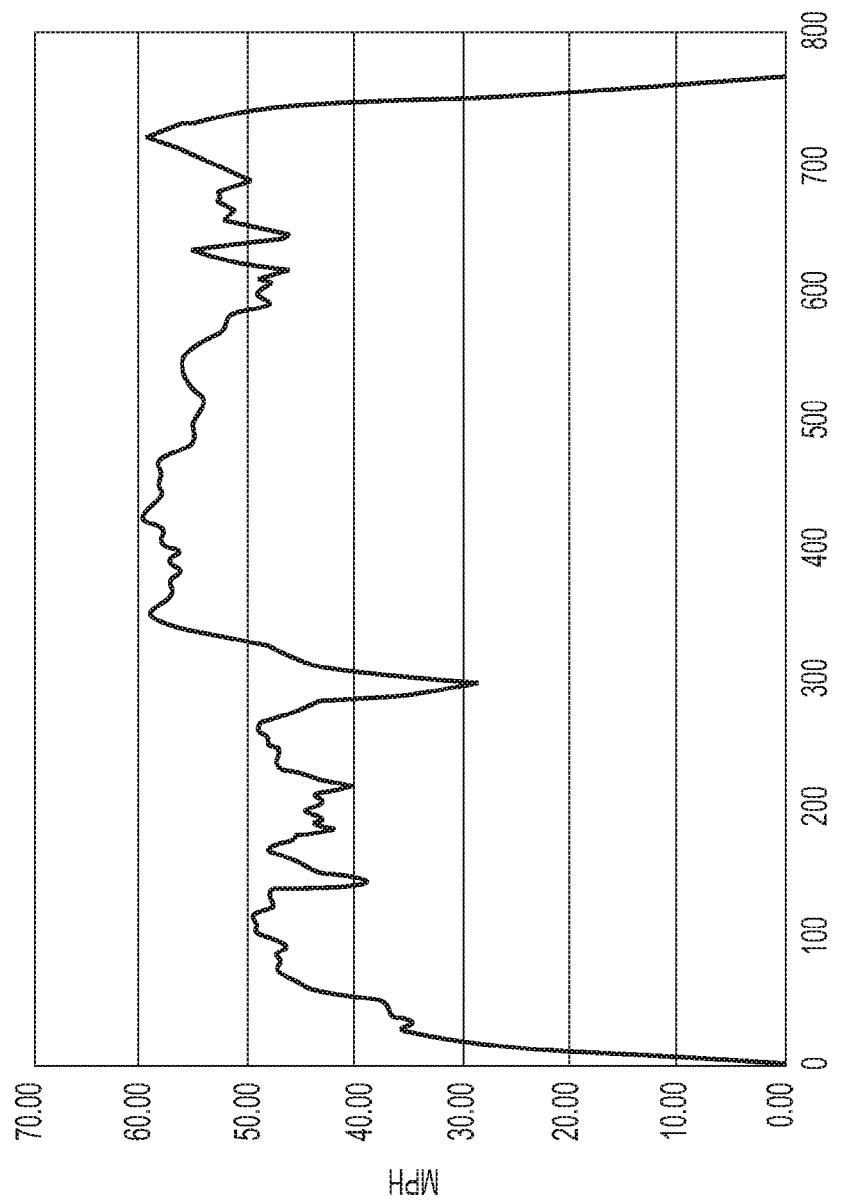

FIG. 5 depicts the US EPA HwFET Highway Driving Cycle used in Example 5.

DETAILED DESCRIPTION OF THE PREFERRED EMBODIMENT(S)

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

The present invention proposes to introduce certain additives into the air-intake system of an engine, which can then carry the additives to the combustion chamber where the additives may be mixed with the fuel or, alternatively, transferred to the internal surfaces of the combustion chamber to, for example, improve friction, lower wear and/or neutralize acids. The introduction of additives to the air intake system for delivery to the combustion chamber with air, as an alternative to formulating such additives in a fuel, provides several advantages discussed in greater detail below.

The method of the present invention can be employed to alleviate or avoid compatibility and/or solubility problems may be encountered when formulating additives in a fuel. Such problems may encompass incompatibility among one or more additives in an additive package, as well as solubility problems when attempting to dissolve or disperse an additive package in a fuel composition. Introduction of the additives to the air intake system also avoids the need to pre-formulate the additives into fuel and the need for subsequent storage of the fuel/additive mixture, thereby avoiding potential storage stability problems for such mixtures. The additives can also be maintained in a controlled environment until use since they are not pre-formulated in the fuel and thus potential problems that may arise due to exposure of fuel/additive mixtures to various environmental conditions encountered in the storage and transport of fuel can be avoided.

The present invention can also be employed to improve engine performance, improve fuel efficiency, more efficiently use additives, improve or alter combustion, clean engine parts and lubricate engine parts. Other uses for the present invention will be apparent to skilled persons from the description below.

One aspect of present invention is a method for introducing additives to a combustion chamber of an engine via the air intake system. Another aspect of the present invention is a delivery system for introducing additives into the combustion chamber of an engine via the air intake system. Yet another aspect of the invention involves the control of aerosol particle size of the additive introduced into the air-intake system. Aerosol particle size refers to the particle size of an additive or additive formulation in a liquid. mist or aerosol form that is introduced into the air-intake system.

The systems and methods of the present invention can be implemented in new vehicles as a built-in feature or can be implemented in existing vehicles by retrofitting of the existing vehicles with the equipment required to implement the system and method of the present invention.

The additives delivered via the air-intake system in accordance with the present invention may be used for a variety of purposes, including, but not limited to, scavenging, friction modification, friction reduction, improving fuel economy, altering octane number, altering cetane number, ignition retardation, ignition acceleration, deposit reduction, detergency, acid neutralization, engine cold start improvement, influencing lube drain interval, antioxidancy, peroxide reduction in the fuel/air-additive mixture in the combustion chamber, corrosion inhibition, anti-settling, cloud point reduction, anti-wear and any combination thereof.

Additives that are suitable for present invention include any composition that can improve the performance of an engine or provide some other beneficial effect. Suitable additives include, but are not limited to, additives that improve emission after-treatment efficiency such as additives that scavenge free radicals or other deleterious materials, modify friction, alter or improve fuel economy, alter octane number, alter cetane number, influence fuel combustion by, for example, altering combustion efficiency, reduce deposits such as direct injection gasoline (DIG) intake valve deposits (IVD), clean air intake systems such as on a DIG, clean DIG external injectors, reduce intake valve deposits (IVD), neutralize acids formed during or after combustion, improve engine cold start, influence lube drain interval, provide antioxidant effects, reduce peroxides in the compressed fuel mixture in the combustion chamber, improve ignition of the fuel, alter or control emissions generated by fuel combustion such as $NO_x$ emissions, improve overall engine operation, and reduce fuel deposits in the engine system such as in cylinders, fuel injectors, and intake/exhaust valves.

The additives may be in the form of solids, gases and liquids. If the additives are solids typically they will be in a form suitable for entrainment in the airflow of the air intake system of an engine. For example, solid additives in the form of microparticles, nanoparticles, femtoparticles or mixtures thereof, may be employed. Alternatively, solid additives can be suspended in a liquid or gaseous vehicle such that they can be transported by the air intake system of an engine to the combustion chamber. In addition, suspension may also include semi-soluble materials, such as colloid, gels and dispersions.

Liquid additives may also be introduced into the air intake system of an engine. In one embodiment, the additive itself is a liquid material. In another embodiment, liquid suspensions or dispersions of nanoparticles, microparticles, and/or femtoparticles may be employed as the liquid additives. Liquid additives can also be in the form of an emulsion, an azeotrope or a mixture of materials in two different phases.

Gaseous additives, such as those obtained from volatile materials, may also be mixed with the airflow of the air intake system and delivered to the combustion chamber.

This provides flexibility for dosing gaseous additives as well as excellent mixing of such additives with the fuel in the combustion chamber.

Ignition retardants are one exemplary class of additives that are suitable for use in the present invention. Some examples of ignition retardants include octane improvers, ferrocene, aryl amines, high octane refinery blend streams, methylcyclopentadienyl manganese tricarbonyl (MMT), propanol, methanol, butanol, ethanol, oxygenates such as MTBE and ETBE, and tetraethyl lead. An ignition retardant may be used, for example, when the gasoline fuel has an octane number or a diesel fuel has a cetane number which can be improved.

Another exemplary class of additives suitable for use in the present invention is ignition accelerants. Ignition accelerants may be used, for example, when the engine combusting the gasoline or diesel fuel warrants ignition acceleration. Examples of ignition accelerants include acetone, alcohol, organic nitrates, peroxides, and peroxyesters. In yet another example, combinations of accelerants and/or retardants are useful in the present invention.

Detergents can also be used in present invention to clean, for example, the air intake system, valves, the combustion chamber and any other parts of the engine contacted by the airflow and/or fuel/air mixture. In an aspect, the detergent for use in the present invention may be a metallic detergent. A suitable metallic detergent can include an oil-soluble neutral or overbased salt of alkali or alkaline earth metal with one or more of the following acidic substances (or mixtures thereof): (1) a sulfonic acid, (2) a carboxylic acid, (3) a salicylic acid, (4) an alkyl phenol, (5) a sulfurized alkyl phenol, and (6) an organic phosphorus acid characterized by at least one direct carbon-to-phosphorus linkage. Such an organic phosphorus acid can include those prepared by the treatment of an olefin polymer (e.g., polyisobutylene having a molecular weight of about 1,000 with a phosphorizing agent such as phosphorus trichloride, phosphorus heptasulfide, phosphorus pentasulfide, phosphorus trichloride and sulfur, white phosphorus and a sulfur halide, or phosphorothioic chloride.

Another exemplary class of additives useful in the present invention is friction modifiers. Friction modifiers can be used to alter the friction characteristics of various parts of the engine. The friction modifiers can be selected from among many suitable compounds and materials useful for imparting this function in lubricant compositions. Non-limiting examples of the friction modifier include long chain alkylene amines, long chain alkyl phosphonates, waxes and dithiocarbamates. Many such modifiers are discussed in U.S. Pat. Nos. 5,344,579; 5,372,735; 5,441,656; and 7,759,294, and US 2010/0006049, which are incorporated herein by reference. Exemplary friction modifiers include free fatty acids, mixtures of mono, di, and trimer acids, diethanolamine cocamides, ethoxylated or propoxylated diethanolamides, hydroxy- and dihydroxyalkylamides of fatty acids, alkylamides of fatty acids, alkylesters of fatty acids, hydroxy- and dihydroxyalkylesters of fatty acids (e.g., glycerol esters), alkylamine salts of fatty acids, hydroxyacetamides, etheramines, synthetic acids, and various diethanolamides.

Another class of additives useful in the present invention is combustion improvers. Examples of suitable combustion improvers include rare earth oxides such as cerium oxide, MMT, oxygenates and like materials, organic nitrates, and organometallic additives based on titanium, molybdenum, manganese, tungsten, platinum, palladium, cerium, zirconium, and tin.

Yet another class of additives that may be used in the present invention is diesel fuel additives. Examples include biocides, demulsifiers, antioxidants, antifoam additives, peroxides, and low temperature operability additives. A further class of additives useful in the present invention is the class of additives used to reduce contamination of exhaust gas after-treatment devices such as catalytic converters. Examples of such additives include scavengers. The phosphorus, sulfur, and lead in exhaust may need to be scavenged to conserve catalytic convertors. One class of effective scavengers are tungsten compounds, which can convert phosphorus, sulfur, and lead in the exhaust to phosphates, sulfides, and lead tungstates. In addition, sulfur scavengers may include any compound capable of reacting with hydrogen sulfide, mercaptans, alkyl, di-, and polysulfides and converting them to more benign sulfur-containing compounds. Exemplary sulfur scavengers include amines, reaction products of aldehydes or aldehyde donors, and amines or amine donors such as imines, triazines, amine-aldehyde polymers, etc., or any other compound capable of reaction with noxious sulfur-containing species such as hydrogen sulfide, thiols, etc. or mixtures or combinations thereof.

The additives for reducing deposits in present invention include Mannich-, PIB-amine-, polyetheramine- and succinimide-type, and mixtures thereof. The succinimides include alkenyl succinimides comprising the reaction products obtained by reacting an alkenyl succinic anhydride, acid, acid-ester or lower alkyl ester with an amine containing at least one primary amine group. These detergents may be formulated with fluidizers that act as co-detergents in combination, and function to prevent low-temperature intake valve sticking.

Anti-wear and/or extreme pressure agents as disclosed in U.S. Pat. Nos. 4,857,214; 5,242,613; and 6,096,691 may also be used in the present invention. Particularly suitable anti-wear agents are the titanium-based anti-wear agents described in US 2008/0223330 A1 and thus these may also be used in accordance with the present invention. Suitable anti-wear agents include phosphorus-containing anti-wear agents such as metal dialkyl dithiophosphates and titanium-based antiwear agents.

A further class of additives that may be used in the present invention are neutralizers of acidic materials such as acidic combustion byproducts. For example, during the combustion process, water and sulfur may combine to form sulfuric acid, or ethanol and water may combine to form acetic acid and/or formic acid which may transfer into the crankcase via blowby past piston rings. Exemplary acid neutralizers can be selected from ash-containing and ashless sources of total base number (TBN). Such materials are well known to skilled persons.

Other classes of additives that are suitable for the present invention include the following additives. Seal swell agents as described, for example, in U.S. Pat. Nos. 3,974,081 and 4,029,587. Suitable antioxidants are described in U.S. Pat. Nos. 5,559,265; 6,001,786; 6,096,695; and 6,599,865. Foam inhibitors suitable for compositions and additives described herein are set forth in U.S. Pat. Nos. 3,235,498; 3,235,499; and 3,235,502. Suitable rust or corrosion inhibitors are described in U.S. Pat. Nos. 2,765,289; 2,749,311; 2,760,933; 2,850,453; 2,910,439; 3,663,561; 3,862,798; and 3,840,549. Suitable viscosity index improvers and processes for making them are taught in, for example, U.S. Pat. Nos. 4,732,942; 4,863,623; 5,075,383; 5,112,508; 5,238,588; and 6,107,257. Suitable, multi-functional viscosity index improvers are taught in U.S. Pat. Nos. 4,092,255; 4,170,561; 4,146,489; 4,715,975; 4,769,043; 4,810,754; 5,294,354; 5,523,008;

5,663,126; and U.S. Pat. Nos. 5,814,586; and 6,187,721. Suitable demulsifiers are described in U.S. Pat. Nos. 4,444,654 and 4,614,593.

Also, additives that replenish depleted engine oil, extending oil life and improving engine efficiency may be employed. This is because certain aspects of the method of the present invention, such as aerosol particle size control, can be used to enable or enhance additive transfer to the oil or crankcase. Examples include friction modifiers such as glycerol monooleate (GMO), antiwear additives such as metal dialkyl dithiophosphates including at least zinc dialkyl dithiophosphate (ZDDP), detergents such as neutral or overbased calcium sulfonates, ashless additives that provide a source of total base number (TBN) and dispersant succinimides, all of which may be depleted from the sump long before the end of the drain interval.

Other additives which may be introduced to the air intake system may include, for example, potentially reactive additives such as drag-reducing polymers, wax anti-settling additives, cloud point reducers, aromatic amines, organic nitrates, organometallic octane enhancers, reactive dienes, and thiophenes. Introduction of these potentially reactive compounds via the air intake system can reduce compatibility problems for other fuel additives that may be formulated in the fuel itself by removing these potentially reactive species from the fuel.

In one embodiment, the fuel that is mixed with the additive(s) in the combustion chamber may include, for example, hydrocarbonaceous fuels such as, but not limited to, diesel fuel, jet fuel, alcohols, ethers, kerosene, low sulfur fuels, synthetic fuels, such as Fischer-Tropsch fuels, liquid petroleum gas, bunker oils, gas to liquid (GTL) fuels, coal to liquid (CTL) fuels, biomass to liquid (BTL) fuels, high asphaltene fuels, fuels derived from coal (natural, cleaned, and petcoke), genetically engineered biofuels and crops and extracts therefrom, natural gas, propane, butane, unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. The diesel fuel herein is meant to encompass at least one or more fuels selected from diesel fuel, biodiesel, biodiesel-derived fuel, synthetic diesel and mixtures thereof.

In another embodiment, the additive(s) are introduced to the combustion chamber but do not necessarily need to mix with the fuel to accomplish their intended function. For example, if an additive is introduced to lubricate one or more parts of the combustion chamber, it need not be mixed with the fuel to accomplish this purpose. For example, the additive could be introduced to the combustion chamber when no fuel is present, e.g. prior to fuel introduction as in a DIG or diesel engine.

In one embodiment the fuel may contain one or more conventional fuel additives and/or additive packages therein. Thus, within the scope of the present invention is the delivery of some additives to the combustion chamber of the engine by pre-mixing them with the fuel, while at the same time delivering one or more other additives via the air intake system to the combustion chamber of the engine.

In the present invention, the additives are introduced into the air intake system of an engine where they mix with the air being taken in by the air intake system to form an air-additive mixture. Any location in the air intake system may be suitable for introducing the additives. Exemplary useful locations include the positive crankcase ventilation (PCV) line or the manifold of the engine. It is an object of the invention to allow the airflow in the air intake system of the engine to carry the additives to the combustion chamber of the engine. In this manner, the additives need not encounter the fuel or other additives that may be present in the fuel, until the airflow is mixed with the fuel in the combustion chamber. In this manner, additives that are not soluble in the fuel can be introduced via the air intake system to obviate the solubility problem. Additives that are not compatible with the fuel and/or other additives that may be present in the fuel can be introduced into the air intake system in order to avoid such compatibility problems. This may allow use of additives otherwise unsuitable for inclusion in fuels or utilization of less expensive additives.

Another advantage of the present invention is that the additives introduced into the air stream treat engine components contacted by the air stream. If the same additives were introduced via the fuel, the additives would not treat the components contacted by the air stream, e.g. the air intake system. This offers the potential for cleaning of the air intake system, as well as the potential to alter the composition of the airflow to the combustion chamber by introduction of various additives directly to the air stream rather than including such additives in the fuel.

Another reason that introduction of certain additives via the air intake system is particularly advantageous is to improve lubrication of the pistons and associated surfaces requiring lubrication. Examples 1-6 below provide evidence of this advantage. Particularly good results were obtained using airborne friction modifiers, including significant reductions in fuel use/improvements in fuel economy and significant reductions in engine torque. Lubricating additives introduced via the airflow in, for example, direct injection gasoline engines and diesel engines, are introduced on the down stroke of the piston whereas lubricating components introduced via the fuel mixture are introduced on the up stroke (compression stroke) of the piston. Introduction of lubricating components on the down stroke of the piston can be employed to increase the contact time with the surfaces in need of lubrication as well as allow the lubricating components to contact a greater portion of the surfaces in need of lubrication.

The present invention provides a means and method for controlling the aerosol particle size which can be used to facilitate certain functions of various additives. For example, additives can be delivered to the air-intake system as a liquid, mist or aerosol having a particle size sufficiently large that that additive will be propelled by its own momentum to cause it to leave the incoming combustion air and impinge on internal surfaces of the combustion chamber when the air/additive mixture is introduced to the combustion chamber. This is enabled by the fact that delivery via the air-intake system causes the additive to be inducted during the air intake stroke of the pistons, allowing these larger particle size additives to travel through the combustion chamber and impinge upon the internal surfaces as a result of their momentum upon induction. This will increase transfer of additive to the oil layer and thus enables oil additive replenishment as well. In this manner, certain additives can be selectively delivered to the internal surfaces of the combustion chamber rather than only to the fuel/air mixture in the combustion chamber. This can be useful for friction modification, acid neutralization, antiwear, cleaning and/or oil additive replenishment.

A further advantage of the present invention is that it permits additive dosing independent of the fuel flow. This provides greater flexibility since it allows precise control of the time of dosing of the additive, and permits control of the amount, aerosol particle size and/or timing of additive dosing. For example, it becomes possible to dose additives in a more flexible manner, such as by periodic dosing, non-linear dosing as well as intermittent dosing or just-in-time dosing on an as-needed basis, all of which are independent of the flow of fuel to the combustion chamber. Also, additive dosing can be done independently of various engine events such as injection timing, crank timing, valve opening, knock, and ignition. As a result, it becomes possible to tailor additive dosing to the particular needs of the engine at a given time. Also, in some circumstances significant reductions in additive usage may be achieved by only dosing additives on an as-needed basis, thereby avoiding unnecessary dosing of additives that may result from the less precise method of including the additive in the fuel supply.

Yet another advantage of the present invention is that it enables changes in additive formulation without stability issues in the fuel or having to reformulate the fuel. For example, the concentration or amount of additive supplied to the combustion chamber in a given time period can be altered without having to reformulate the fuel. Also, if two or more additives are supplied to the air intake system, the additives can be reformulated into different mixtures over time without having to reformulate the fuel. Further, a particular additive can be replaced with another additive in a container in the additive supply system of the invention without having to alter the fuel composition, thereby allowing use of new or different additives at different times during the life of the engine. Finally, the aerosol particle size of the additives may be varied depending on the particular needs at a particular time. This allows for significantly greater flexibility in additive formulation and use.

A further advantage of the present invention is that it allows for use of particulate additives since the particulate additives can be entrained in the airflow or can be suspended or dispersed in a vehicle just prior to introduction to the air intake system. This provides greater control of dosing of such additives by avoiding the potential problem of inhomogeneity due to inadequate mixing, separation or precipitation which may result from such additives residing in a fuel mixture over an extended time period. For the same reasons, the present invention permits use of multi-phase additives that would be problematic if the additive were to be introduced via the fuel.

In some cases, dosing of the additive via the air intake system can be used to improve transfer of the additive to the lubricant of the system relative to addition of additive via direct injection or inclusion of the additive in the fuel or oil. Example 1 below demonstrates this concept using an air-borne friction reducer. In this manner, the total base number or antioxidancy of the lubricant can be changed more efficiently by additive introduction via the airflow than, for example, by direct injection of the additive to the combustion chamber.

The additives are carried by the airflow in the air intake system into the combustion chamber of the engine, where the air-additive mixture and fuel are mixed to form a fuel/air-additive mixture. The mixture may include additives that transfer directly into the oil layer found on the walls of the cylinder. The remaining mixture is then combusted.

Liquid additives or liquid additive formulations may be sprayed into the airflow as a mist or in atomized form into the air intake system using, for example, sprayers, injectors and/or atomizers. Liquid additives are preferably in the form of small droplets or aerosol particles that can be easily carried by airflow in the intake system to the combustion chamber. Aerosol particle size can be controlled to influence the delivery and effect of the additive components. Any suitable carrier may be used in such liquid additive formulations including organic carriers, aqueous based carriers and mixtures thereof. Other parameters of the additive component and/or additive addition including, for example, penetration, momentum, time of flight and degree of volatilization can be controlled to improve additive addition, transport, mixing and/or performance.

The additive may optionally be atomized. Atomized droplets are very small and are thus capable of mixing with the airflow and ultimately the fuel in the combustion chamber to form a more homogeneous mixture. This can be exploited to achieve a more efficient use of the additives. Various types of atomization can be employed including electron/charge atomization, sonication, and air impact atomization.

The device for atomizing liquid additives may be any suitable device. Some exemplary atomizing devices include atomizing spray nozzles, atomizing injectors, sonicators, electron/charge atomization devices and air impact atomization atomizers (such as a single fluid atomizer, a two fluid nozzle or a rotary or wheel atomizer). Pressure nozzles, pneumatic nozzles or sonic nozzles may also be employed as long as the appropriate aerosol particle size and spray pattern are obtained. The selection of a suitable atomization device may be dependent upon the viscosity and other characteristics of the additives and is within the capability of a skilled person.

The additives may also optionally be volatilized. Various volatilization devices may be used in present invention. Volatilization can be accomplished by heat, pressure expansion or other suitable, conventional means. For example, additives may be volatilized in a high temperature flame or a gas plasma torch. In another exemplary embodiment, a pair of volatilization devices operated in series can be used, the first one operating under pressure and the second one operating under vacuum. The system of the present invention may optionally include one or more volatilization chambers.

Additives employed in the form of suspensions or emulsions may be stored in such forms or the suspension or emulsion may be formulated on an as-needed basis by the system of the invention by mixing of two or more components. As a result, the system of the invention may include two or more storage containers, a mixing chamber and a mixer for the purpose of formulating additives in the form of mixtures, suspensions or emulsions.

Particulate additives can be dosed in a suspension or emulsion or can be dosed in powder form directly to the air stream. In one embodiment, the system of the invention includes a metering device suitable for metering particulate additives for introduction to the air stream. In another embodiment, when a particulate additive is required, a portion of the air stream can be directed through a container of the particulate additive to entrain at least some of the particulate additive in the air stream. The portion of the air stream containing entrained additive can then be redirected back to the air intake system. In this embodiment, the amount of additive is controlled by controlling the amount of air that is redirected through the container of particulate additive, based on the amount of additive that can be entrained by a particular amount of airflow.

When multiple additives are employed, the additives may be separately introduced into the air intake system each by a separate introducing device. Alternatively, the additives may be mixed and then introduced into the air intake system as a mixture. The system of the invention may include a mixing device to mix multiple additives before they are introduced into the intake system, as well as one or more metering devices for metering particular amounts of each of the additives that are to be employed. The mixing device may be of any kind that is suitable for the mixing of additives, such as a mixing chamber, a static mixer, a dynamic mixer, or any stirred pre-mix chamber.

Multiple additives may be housed in separate containers, or separate compartments in the same container. One or more additive introducing devices such as sprayers, metering devices, injectors or other suitable means may be operably associated with the containers for controlling the aerosol particle size and/or delivering the additives from the containers to the air stream or a mixing device for preparation of an additive mixture.

Some additives may require heating, for example, in cold weather, to reduce the viscosity of the additive. Thus, the system of the invention may optionally include a heating mechanism to heat one or more of the additives or one or more containers in which the additives are housed, as needed.

One of the important advantages of the invention is that because the additives are introduced via the airflow and need not be pre-mixed with the fuel, the introduction of additives to the air intake system and/or combustion chamber may be precisely controlled by a control system. The control system may regulate at least one of the amount, timing of introduction and aerosol particle size of additives into the air intake system. In addition, when multiple additives are used in present invention, each additive may optionally be independently regulated by the control system.

An exemplary additive introduction system in accordance with the invention for introduction of one or more additives to the air intake system 12 of an engine 14 is shown in FIG. 1. In this system, an additive component, which may be a single additive, mixture of two or more additives or a formulation containing one or more additives, is stored in a container 16. A metering device 18 is employed to meter an amount of additive from container 16 to air intake system 12, which carries the metered amount of additive to, for example, a combustion chamber of engine 14. The arrows in FIG. 1 indicate the direction of additive transport.

Metering device 18 can feed additive to any suitable location in the air intake system 12. Any suitable, conventional metering device 18 may be employed to meter the amount of additive desired from the container and feed it to the airflow system. In some cases, it may be desirable to feed additive to a location near the air intake port of air intake system 12 if the additive is of a type for which contact with the surfaces of the air intake system 12 may be desirable, e.g. a detergent for cleaning air intake system 12. In other cases, it may be desirable to feed the additive to the air intake system 12 at a location close to the combustion chamber if the additive is of a type that accomplishes its primary function in the combustion chamber, e.g. additives that influence combustion, lubricating additives, etc. If two or more additives are to be fed to the air intake system 12, different additives can be fed to the air intake system at different locations to take into account these factors and to control the distance that such additives need to be transported by the airflow.

The additive introduction system of FIG. 1 may also comprise a control system 20. Control system 20 is operably connected via a connection 22 to metering device 18 so as to be able to exert control over at least one of the amount, timing of additive introduction and aerosol particle size from container 16 to air intake system 12. Control system 20 shown in FIG. 1 is also connected to a sensor 26 by a data connection 24 for the purpose of obtaining data about an operating condition of engine 14 based upon which control determinations made by control system 20 will be made. This can be accomplished using conventional sensors that may sense various operating parameters of engine 14.

The control system 20 may actuate additive valves to dispense the additives included in the additive containers. Accordingly, the control system 20 may actuate the additive valves to selectively add different additives. The control system may actuate the additive valves to dispense liquid from the additive containers when the additive is a liquid. The additive containers may dispense liquid under pressure. For example, the control system 20 may actuate a pressure source such as a pump to inject liquid additive into the air intake. The liquid additive may have a range of viscosities.

Figure 2:
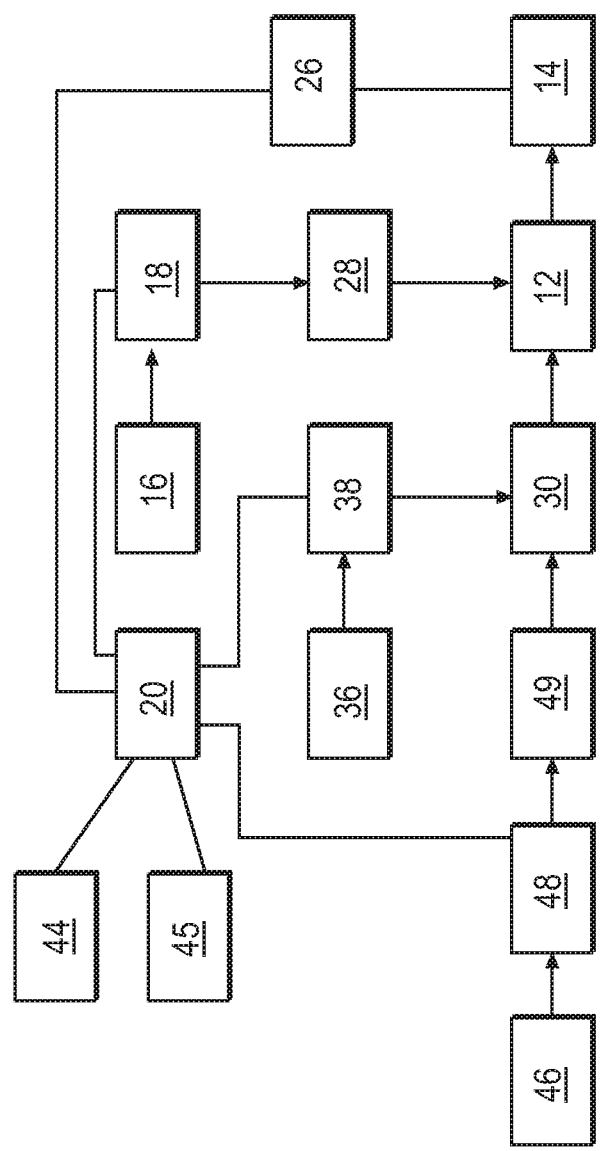

Another embodiment of the invention is shown in FIG. 2. In this embodiment, two or more additives are fed to the air intake system 12 at different locations and are carried to the combustion chamber of engine 14 by the airflow in air intake system 12. Again, the arrows in FIG. 2 indicate the direction of additive transport. In the system of FIG. 2, a first additive component is stored on container 16 and is metered by metering device 18 to a heater 28 to volatilize the additive component. The volatilized additive component is then fed to air intake system 12 for transport to a combustion chamber of engine 14. Metering device 18 is connected to control system 20 via connection 22. Control system 20 also controls metering device 18 via connection 22.

In the embodiment of FIG. 2, control system 20 is configured to obtain data about an operating condition of engine 14 via data connection 24 from sensor 26. One or more sensors 26 may be employed, as desired. In addition, control system 20 is configured to obtain data from the electronic control module (ECM) 44 of the apparatus in which engine 14 is mounted via a data connection 43. Control system 20 is also configured to obtain data from a global positioning system (GPS) 45 via a data connection 46. The data obtained from these sources may be used individually or in combination for the purpose of controlling the various metering devices 18, 38 and 48 of the additive introduction system of FIG. 2.

The embodiment of FIG. 2 is also capable of feeding a second additive component to air intake system 12 from a second container 36 using a second metering device 38. Second metering device 38 is also connected to control system 20 via connection 42 such that second metering device 38 is also controlled by control system 20. The same or different data or control algorithm can be used by control system 20 to control second metering device 38 as for control of other metering devices 18, 48. Typically, different data and control algorithms are used to control metering of different additive components to provide the greatest flexibility in the operation of the additive introduction system.

In the embodiment of FIG. 2, the second additive component is metered to a mixing device 30 by second metering device 38 where the second additive component is pre-mixed with a third additive component and/or a vehicle such as a suspension agent, prior to being fed to air intake system 12. The third additive component is metered from third container 46 by third metering device 48 to an atomizer 49 prior to being fed to mixing device 30. Third metering device 48 is also connected to control system 20 by a connection 47 such that third metering device 48 can be controlled by control system 20 as well. Various other embodiments and combinations of system components are possible and within the scope of the present invention.

In another embodiment, the invention is an electro-mechanical system designed to deliver chemicals to the combustion chamber of an engine independent of the fuel or engine oil. The system includes one or more atomizing devices mounted in the intake-air system tailored to deliver chemicals via the combustion air into the combustion chamber by controlling droplet or aerosol particle size. Droplet or aerosol particle size is imparted by design of the injection device depending on the specific intended application. For instance, larger or heavier droplets would be created to assure better delivery of friction modifying chemicals directly to the cylinder wall due to the effect of momentum, whereas an ultra-fine aerosol would be created for combustion-improving chemicals that require thorough mixing with the combustion air and injected fuel.

Many engines built today employ a mass-flow meter and/or an engine control computer to effect proper stoichiometric mixtures of fuel and air, as well as collecting a variety of different types of information about the engine and/or vehicle and its operation. The present invention can be combined with these existing systems to provide an injection system that meters in additives independent of the air and fuel. For instance, it is widely known that friction is at its highest when engine speed is low and load is high. Injecting the right amount of friction-modifying chemicals at these conditions may be used to provide greater reductions in friction than is currently possible with fuel-delivered friction modifiers.

In the case of direct injection gasoline engines (DIG engines) the present system of additive injection could be used to clean up or keep clean intake valves. These engines currently experience build-up of oil-related deposits that emanate from PCV gas recirculation because they do not have the benefit of gasoline being sprayed onto the valve surface as is the case in port-injection engines. Thus, it is expected that the present invention can provide improved intake valve cleanliness in DIG engines, as well as improved fuel economy by delivering additives that impinge directly onto the cylinder wall due to aerosol particle size manipulation and the fact that the additives are introduced on the air intake stroke rather than with the fuel, thereby allowing the additive to wet the valve surfaces prior to fuel introduction. These additives would affect instantaneous fuel economy improvements while also accumulating in the engine oil and leading to fuel economy maintenance.

To address certain types of engine issues, control of the aerosol particle size used for additive delivery can be employed. For example, in DIG engines, it may be desirable to ensure that a friction reducer is fed to the combustion chamber via the air intake in a form that will cause the friction reducer to drop out of the air in the combustion chamber to lubricate the internal surfaces of the combustion chamber, e.g. in the form of large liquid droplets of a size large enough to drop out of the air flow from the air intake system when the air arrives in the combustion chamber. In this manner, delivery of the additive to the desired location on the internal surfaces of the combustion chamber can be enhanced. This delivery option may be particularly well suited for cleaning, acid neutralization, friction modification, antiwear, control of deposits on surfaces contacted by the additive and oil additive replenishment.

In another variation, a small aerosol particle size for delivery of the additive may be selected to ensure that the additive remains entrained in the intake air even when the air/additive mixture arrives in the combustion chamber. In this manner, a larger amount of the additive will mix with the fuel/air mixture in the combustion chamber and not adhere to the wall of the chamber. This delivery option may be particularly well suited for additives designed to enhance or alter combustion characteristics.

In another aspect, the present invention can be used, for example, to stabilize engine oil oxidation throughout oil life via the delivery of oxidation inhibitors to the air intake system that washes past the piston rings. The present invention can also be used to provide improved combustion by changing the effective instantaneous resistance to knock of the fuel/air mixture. The present invention can also be used to achieve knock reduction which can be characterized by one or both of a reduction in the severity or frequency of knocking.

In a further aspect, the invention offers the ability to tailor delivery of additives for specific purposes. This can be integrated with the existing engine control computer to provide additive delivery independent of the fuel delivery rate and according to a predetermined effectiveness map.

The control system of the present invention may use any information that is available from the apparatus upon which it is mounted and/or may be connected to one or more data gathering devices specifically provided to gather data for the control system. The present invention may also be implemented without interfacing with the onboard computer control system or the electronic control module of a vehicle or engine. Instead, the method and system of the present invention can be manually controlled by a user or service personnel, or can be controlled based on user or service personnel input, or other parameters such as passage of time.

It is also possible to equip the system of the present invention with one or more of its own data-gathering devices for gathering data needed for control. For example, an interface with the global positioning system, sensors to monitor time passage, miles driven, engine starts or various parameters of engine operation may be included in the system of the invention as an alternative to, or in addition to, obtaining data from onboard computer systems or the other sources listed above. Control can then be responsive to data gathered by such equipment taken alone or in combination with data from any other source. Combinations of these various data gathering and control methods may also be used.

In one embodiment, the control system will obtain data from the ECM of a vehicle, though data may also be obtained from various sensors, a GPS device or any other suitable source of data that may be used to control additive introduction. Exemplary information that may be employed by the control system includes, but is not limited to, type of fuel, anticipated conditions to be encountered by the apparatus such as upcoming road conditions, e.g. grade, type of road surface, average vehicle speed on a road, a presence of precipitation on a road surface, etc., octane number, cetane number, air-fuel ratio, climate conditions such as air temperature and humidity, elevation, engine load, engine speed, oil pressure, wheel speed, mass airflow speed, engine cleanliness, emission levels, oxygen content of air, manifold vacuum pressure, tire pressure, driver characteristics, valve timing, particulate trap light-off, hybrid powertrain strategy, manual addition of additive, cylinder on demand or cylinder deactivation, and any combination thereof. Such information is preferably collected by the ECM, GPS or other satellite connection of a vehicle, and provided to the control system via one or more suitable data connections. This enables real-time control of additive addition. Optionally, in one embodiment the control system may be a component of the ECM.

The control system may use information on the upcoming driving conditions to regulate the introduction of additives. For example, when the vehicle is about to climb a steep slope, the control system can adjust the additives to fine-tune combustion for climbing. Another example is that when the vehicle is about to enter a highway, the control system can adjust the additives to fine-tune the engine operating parameters for highway driving.

The control system can optionally be provided with one or more sensors to collect information that may be used to decide the amount, aerosol particle size and/or timing of the introduction of additives. In addition, user input can be employed to influence the control system. For example, a user may be permitted to select from various operating modes such as a mode designed to maximize fuel efficiency, a mode to maximize acceleration or engine output or a mode that balances one or more of various factors. Other user input can also be employed. The control system can be programmed to take into account such user preferences in determining the timing, aerosol particle size and/or amount of additive dosing.

The control system can also be provided with, or create, a map of one or more of the parameters discussed herein which can be related to engine operation. This map can then be cross-referenced with an amount and type of additive or additives that are to be dosed when certain conditions set forth in the map are present. In this manner, additive dosing can be regulated automatically based on the mapped parameters.

The control system may receive other types of user input from a service technician and/or vehicle operator, preferably via a computer link to the control system. Other types of user input may include the type and amount of fuel additives provided via the fuel, type and amount of fuel additives provided via the air stream, the octane or cetane number of the fuel employed, whether the fuel contain ethanol or other types of fuel components, as well as the amount of various types of fuel components contained in the fuel.

In certain cases, the control system may follow a predetermined program of additive addition not based on information gathered but instead based on knowledge that a certain type, aerosol particle size and/or amount of additive should be introduced at predetermined time intervals, e.g. for cleaning the air intake system, and modifying the drain interval based on an oil-lifetime algorithm or other scheduled maintenance. For example, periodic additive dosing based on passage of time can be employed.

In some cases, the additive will be added to the air-intake system by manual control. For example, a user may be able to dose additive by pressing a button or otherwise actuating the additive dosing apparatus. Similarly, a technician may manually dose additive, for example, at periodic service intervals such as in conjunction with regular oil changes.

Each of the various modes of control may be combined with one another to provide customized control. For example, use of a predetermined program of additive addition can be combined with control based on information designed to sense conditions exceeding certain thresholds which may require addition of additive above and beyond that which has been preprogrammed, or which may prevent addition of additive according to the program, if such additive addition is determined to be unnecessary.

The control system may also generate output for review by the service technician or vehicle operator. Such output may include an indicator that indicates a time to add more of one or more additives to the containers. Output may also include a history of the data collected by the control system, processed data collected by the control system indicating various parameters of vehicle operation, as well as a history of additive usage. Output can also be used to correlate additive usage with various data such as fuel efficiency, specific operating conditions, driving habits, types of driving, climate conditions, elevation, emission levels, etc.

The additive containers may include level sensors that generate additive level signals indicating of an amount of additive remaining in the additive containers. The control system may determine the amount of additive remaining in the containers based on the additive level signals from the sensors. Alternatively, the control system may determine the amount of additive remaining in the containers based on open loop control. For example, the control system may determine or be provided with an initial amount of additive in the containers, then determine a current amount of additive in the containers based on amount of additive used over time. The control system may generate user output based on the additive level thus obtained.

The control system may include a data collection module, a determination module, and an additive actuation module. The receiving module is for receiving the necessary information used to determine the amount, aerosol particle size and/or timing of the addition of additives. The receiving module may receive information from various sources and may collect a wide variety of different types of information as discussed above.

The determination module determines the amount, aerosol particle size and/or timing of each additive being introduced to the air intake system. This determination is made based on processing of some or all of the information received using various algorithms. Suitable algorithms are within the capability of the skilled person based on the current level of knowledge pertaining to the various additives, their effects, and under what conditions it is desirable to add them. The determination module also considers the type and characteristics of the additives used.

The additive actuation module actuates the additive introduction via one or more metering devices, e.g. valves to cause dispensing of additive into the air intake system. The additive actuation module may apply a voltage and/or current to a valve to actuate the valve to dispense additive.

The additive actuation module may actuate the additive valves to dispense additive. The additive actuation module may apply a voltage and/or current to the additive valves to actuate the additive valves to dispense the additives. The additive actuation module may actuate the additive valves for a predetermined period to dispense a predetermined amount of additive.

The additive actuation module may provide user output when an additive is below predetermined level in the additive containers. User output may include setting a code to notify a service technician that additive is not available in the additive containers. User output may also include setting an indicator light to notify a vehicle operator that additive is not available in the additive containers. Alternatively, the user output may indicate that the amount of additive remaining in the additive containers is less than or equal to an additive threshold.

The present invention is suitable for gasoline and diesel combustion engines, internal combustion engine, spark ignition engine, compression ignition engine, oil burners stationary engines, turbines such as wind turbines, exhaust odorizes.

The present invention alleviates the compatibility and solubility problems for fuel additives, which may revolutionize additive formulation. For example, the present invention allows cheaper additives to be used without compatibility or solubility issues; additives that are not suitable to be pre-added to fuel may still be used; or additives that are not compatible with each other may be separately used with one or more being added to the fuel and others being introduced through the air intake system.

In one aspect, the present invention relates to a method for introducing at least one additive to a combustion chamber of an engine through the engine's air-intake system, comprising the steps of:
    determining an amount, aerosol particle size and/or timing of addition of said at least one additive based on information selected from type of fuel, upcoming road conditions, octane number, cetane number, air-fuel ratio, climate conditions, elevation, engine load, engine speed, oil pressure, wheel speed, mass airflow speed, engine cleanliness, emission levels, oxygen content of air, manifold vacuum pressure, tire pressure, user input, driver characteristics, valve timing, particulate trap light-off, hybrid powertrain strategy, technician input and any combination thereof;

introducing said at least one additive into said air-intake system of an engine in accordance with said determining step to produce an air-additive mixture;

combining said air-additive mixture in the combustion chamber with fuel to provide a fuel/air-additive mixture; and combusting said fuel/air-additive mixture.

In this embodiment, the at least one additive may be in the form of a liquid or a suspension of particles selected from nanoparticles, microparticles, and femtoparticles. The introducing step may involve spraying said at least one additive as a mist suitable to be carried by airflow in the air intake system to the combustion chamber. The additive may have an aerosol particle size sufficiently small to ensure that substantially all of the additive remains in the fuel/air-additive mixture in the combustion chamber. The method may also include a step of atomizing or volatilizing the at least one additive. When the additive is a liquid, it may have an aerosol particle size sufficiently large to ensure that at least a portion of said additive contacts at least one inner surface of the combustion chamber.

The introducing step may introduce the additive into the positive crank ventilation line of said engine.

The at least one additive may include a plurality of additives and the method may include an additional step of mixing the plurality of additives before introducing the additives into said air-intake system. Alternatively, when using a plurality of additives, the additives may be separately introduced into the air-intake system.

The upcoming road condition may be selected from grade, type of road surface, average vehicle speed on a road and a presence of precipitation on a road surface.

In another embodiment, the present invention relates to a system to introduce additives to the combustion chamber of an engine through the engine's air-intake system, comprising:

at least one container that houses said additive;

a control system to regulate the addition of said additive based on information selected from type of fuel, upcoming road conditions, octane number, cetane number, air-fuel ratio, climate conditions, elevation, engine load, engine speed, oil pressure, wheel speed, mass airflow speed, engine cleanliness, emission levels, oxygen content of air, manifold vacuum pressure, tire pressure, user input, driver characteristics, valve timing, particulate trap light-off, hybrid powertrain strategy, technician input and any combination thereof; and a device to introduce said at least one additive into the air-intake system of an engine responsive to said control system.

The system may be adapted to accommodate introduction of a plurality of additives. For this purpose, the container may be provided with a plurality of compartments to house said plurality of additives. Alternatively, the plurality of additives may be housed in plurality of containers. The system may also include a device to mix the plurality of additives prior to introduction of said additives into said air-intake system.

The device to introduce said at least one additive can be an injector to spray said at least one additive as mist. The system can also include a device to atomize said at least one additive prior to introduction of said additive to said air-intake system.

In another embodiment, the system includes a device for providing information selected from information about a type of fuel, upcoming road conditions, octane number, cetane number, air-fuel ratio, climate conditions, elevation, engine load, engine speed, oil pressure, wheel speed, mass airflow speed, engine cleanliness, emission levels, oxygen content of air, manifold vacuum pressure, tire pressure, user input, driver characteristics, valve timing, particulate trap light-off, hybrid powertrain strategy, technician input and any combination thereof, to said control system. The control system can be provided with a plurality of sensors to collect information about the vehicle on which said engine is mounted. The system can also include a device to allow a user to give instructions to said control system.

The present invention will be further illustrated by the following non-limiting examples.

EXAMPLES

Example 1

A Motored Engine Friction Test (SpinMaster Test) was conducted on a non-fired (electrically motored) engine to measure parasitic friction as a function of lubricant properties. This is a friction test that eliminates all other sources of signal, such as effects on combustion efficiency or engine cleanliness.

A 2008 Cadillac SRX 3.6L High Feature (HF) V6, 4-cycle engine was used as the test apparatus. The engine incorporates dual overhead camshafts, 4 valves/cylinder, dual stage plenum induction manifold, 94×85.6 mm bore & stroke, with 10.2:1 compression ratio. The engine was turned by a variable-speed electric motor. Because this was a non-fired engine, this test stand was equipped with external oil and coolant temperature control. The oil temperature during a run was maintained at 115° C. During the test the engine was ramped from 600 to 2900 RPM. Torque was measured continuously, while a mist of airborne friction reducer additive was introduced directly into the intake manifold of the engine.

Figure 3:
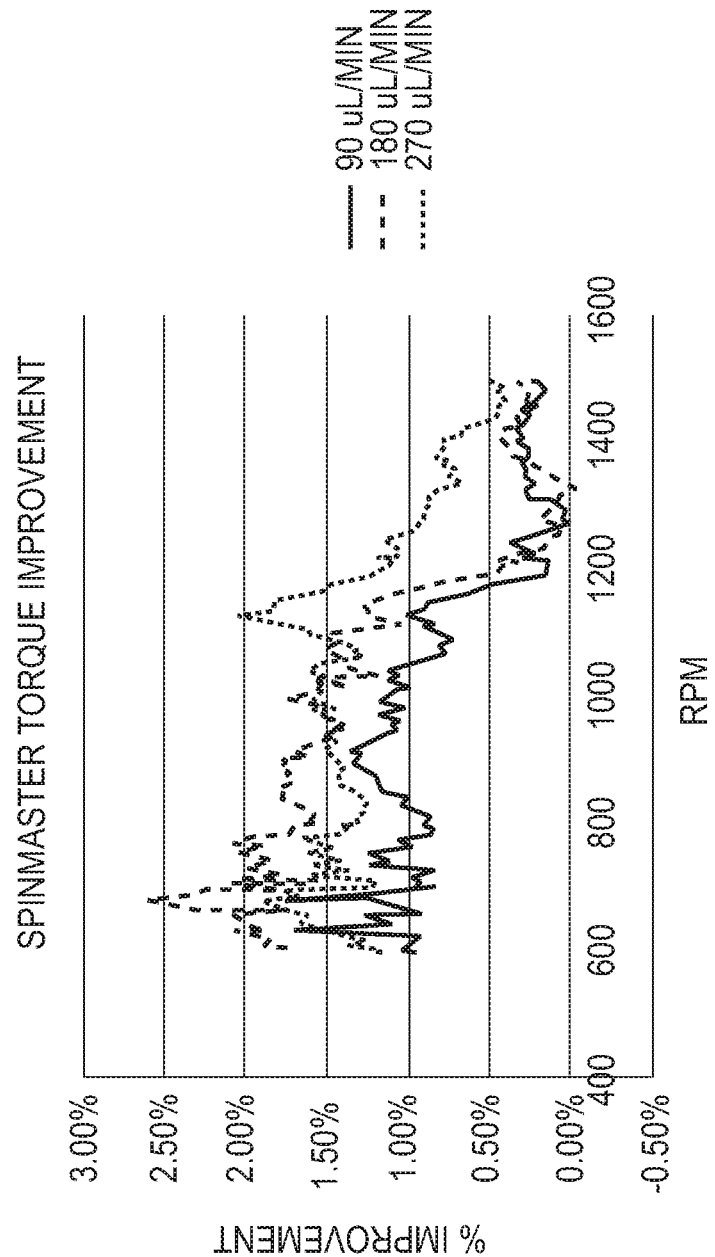

Dosing of the airborne friction reducer was held constant throughout the speed sweep. 0, 90, 180, and 270 uL/min of HiTEC® 6457 (A friction reducer available from Afton Chemical) was fed to the engine via a syringe pump through a Perkin Elmer Model N3110109 stainless steel air-assist atomic-absorption nebulizer. Air flow into the nebulizer was set at 3 SLPM at 40 psig. No friction reducing additive was introduced to the engine via the oil. The improvement in torque in the range of 600 to 1500 rpm is shown in FIG. 3.

The average torque improvement in the range of 600 to 1500 RPM for each additive feed rate, relative to an additive feed rate of 0, is shown in Table 1 below.

TABLE 1

Torque Reduction With Airborne Additive Feed

| Airborne Additive Fee Rate (uL/min) | Percent Improvement of Torque |
| --- | --- |
| 90 | 0.76% |
| 180 | 1.18% |
| 270 | 1.28% |

It was also observed in this test that up to a 2.5% improvement in torque can been achieved under certain conditions. Only 2.7 grams of the friction reducing additive was consumed during the test, which employed 5000 grams of fresh oil charge. Thus, the amount of additive used in this test was much less than the typical 25% by weight of fuel-borne friction reducing additive that is transferred to the crankcase oil in a fired engine. In this example, the transfer of friction reducing additive to the crankcase oil was infinitesimal, indicating that the friction reducer likely accumulates in the cylinder to produce the observed effects. It was also observed that some level of torque reduction was maintained even if the feed of airborne friction reducing additive was turned off after a period of time, further indicating that the friction reducer accumulates in the cylinder to produce the observed effects.

Example 2

An emissions fuel economy test was conducted on a diesel engine with airborne additive fed to the combustion chamber. The diesel engine was a 2002 Volkswagen Jetta 1.9-L, 4-cylinder diesel engine with a turbocharger. Testing consisted of New European Driving Cycle (NEDC) driving cycles; with Phase 1 representing city driving and Phase 2 representing highway driving. The vehicle was warmed up before testing using two NEDC throw-away runs. Tailpipe emissions were measured during the testing and carbon-balance was used to determine the fuel consumption. Standardized engineering practices were employed throughout the test. The fuel was a Colonial Pipeline ULSD fuel. Duplicate tests were run with and without feed of an airborne additive.

During testing with additive feed, HiTEC® 6457 (50% solution, available from Afton Chemical), a commercially available friction reducer, was injected into the air intake system of the vehicle via a syringe pump that fed a Perkin Elmer Model N3110109 stainless steel air-assist atomic-absorption nebulizer. Air flow into the nebulizer was set at 4 SLPM at 60 psig. The additive dosing was held constant throughout each cycle. During the tests without feed of airborne friction reducer, the air flow was maintained at 4 SLPM, as a control.

The results of the test are shown in Table 2. The average fuel economy improvement with the feed of airborne additive as compared to no airborne additive feed during the two tests was 0.89% in a highway driving cycle and 1.60% in a city driving cycle. The reductions in diesel fuel consumption (i.e., calculated by removing the fuel value of the additive pack) were 1.46% and 2.97% respectively.

TABLE 2

Fuel Economy Improvement, 2002 VW Jetta

| Experiment | HiTEC 6457 (mg/min) | NEDC Phase 1 (mpg) | NEDC Phase 2 (mpg) |
|---|---|---|---|
| 1 | 0 | 30.425 | 49.335 |
| 2 | 0 | 30.763 | 49.627 |
| 3 | 119.9 | 30.955 | 49.915 |
| 4 | 119.9 | 31.215 | 49.926 |
| Average % FEI > | | 1.60% | 0.89% |

For comparison to use of a fuel borne additive, the same testing protocol was used, except an equivalent amount of friction reducer HiTEC® 6457 was directly added to the diesel fuel, rather than the air stream. The airborne additive showed a 0.44% fuel economy improvement in Phase 1 city driving and a 0.20% fuel economy improvement in Phase 2 highway driving over the fuel borne additive. This demonstrates that the method of the present invention of feeding additive through the air stream produces consistently better fuel economy than adding the same amount of the same additive via the fuel.

Example 3

Another test was conducted on a fired engine on a stand with a feed of friction reducing airborne additive. The engine was a 1997 passenger car, 4.6-L Ford V-8 with a single overhead camshaft and port fuel injection. The factory engine control module (ECM) was used with a piggyback aftermarket ECM that allowed for control of spark timing curves, along with fuel trims, temperature inputs, and manifold absolute pressure (MAP). The test engine was connected to a 470 HP electric dynamometer via a Himmelstein torque meter. Fuel consumption was measured with a Micromotion Model DS0063100SU mass Flow meter.

Prior to testing, the engine was warmed up for 40 minutes. Testing consisted of four 10-minute stages during which fuel consumption was recorded. Engine speed was fixed at 1500 RPM, while MAP was controlled at 30, 40, 60, and 80 kPa.

The fuel was Haltermann EEE, an industry-standard test fuel. It contained no additives. The oil used was a commercial Pennzoil meeting the ILSAC GF-5 quality level and of the SAE 5W30 viscosity grade. Back-to-back testing was done with or without additive injected into the air stream of the engine. During testing with airborne additive injection, HiTEC® 6457 (50% solution, available from Afton Chemical) friction reducer was injected into the air intake system of the vehicle via a syringe pump that feeds a Perkin Elmer Model N3110109 stainless steel air-assist atomic-absorption nebulizer. Air flow into the nebulizer was set at 3 SLPM at 40 psig. The additive dosing was held constant throughout all cycles. During the baseline run of the experiment where no friction reducer was added, the air flow was maintained at 3 SLPM, as a control.

It was observed that the airborne injection method of the present invention requires much less additive to achieve the same results as could be achieved using a fuel borne additive feed. The reduction in additive usage may be due to the fact that the airborne additive feed does not require additive in every drop of fuel; and the airborne additive feed method can be used to more precisely control the amount of additive fed to the combustion chamber of the engine.

The results of the test are shown in Table 3. In this test, the fuel economy improvement was observed to be in the range of 0.68 to 1.38% depending upon the engine load condition. After correction for additive fuel value, the fuel consumption improvement was observed to be in the range of 0.35% to 1.24%, which is a very significant improvement.

TABLE 3

Average Fuel Consumption (kg/hr)

| MAP (kPa) | Baseline Run | HiTEC 6457 119.9 mg/min | % Change | Corrected % Change |
|---|---|---|---|---|
| 30 | 2.990 | 2.960 | −1.00% | −0.52% |
| 40 | 4.275 | 4.246 | −0.68% | −0.35% |
| 60 | 7.282 | 7.197 | −1.17% | −0.97% |
| 80 | 10.325 | 10.183 | −1.38% | −1.24% |

Thus, the airborne introduction of friction modifier produced two significant benefits, a reduction in fuel usage and a reduction in torque in the engine.

Example 4

A test of knock severity was conducted using an airborne feed of methylcyclopentadienyl manganese tricarbonyl (MMT) in a fired engine on a stand. The engine was a 1997 passenger car, 4.6-L Ford V-8 with a single overhead camshaft and port fuel injection. The factory ECM was used with a piggyback aftermarket ECM that allowed for control of spark timing curves, along with fuel trims, temperature inputs, and manifold absolute pressure (MAP). The test engine was connected to a 470 HP electric dynamometer via a Himmelstein torque meter. Engine knock was measured with a K-MON knock monitor available from Gizzmo Electronics. The meter had an output of 0 to 5 volts, which was proportional to the severity of the knock event. A center frequency of 6.37 kHz was chosen to match the known frequency of a 4.6-L Ford V8 engine. The bandwidth of detection was set to +/−2 kHz. Using this sensor, an output of greater than 1.5 volts would be potentially damaging to the engine. Thus, the spark timing was adjusted to operate around 0.75 volts on the base fuel.

Prior to testing, the engine was warmed for 40 minutes. Testing consisted of a 10 minute stage with the engine speed fixed at 3500 RPM and the MAP set to 60 kPa. The fuel was a sub-standard octane fuel with (R+M)/2 equal to 85 octane number. The fuel contained no additives.

Back-to-back testing was done with or without additive injected into the air stream of the engine. During testing with HiTEC® 3000 (MMT, 50% solution available from Afton Chemical) octane improver injected into the air intake system of the vehicle via a syringe pump that feeds a Perkin Elmer Model N3110109 stainless steel air-assist atomic-absorption nebulizer. Air flow into the nebulizer was set at 3 SLPM at 40 psig. The additive dosing (500 uL/min) was held constant throughout the test. During experiments without the airborne additive injection, the air flow was maintained at 3 SLPM, as a control.

The knock events recorded during the test are shown in Table 4. A significant reduction in knock events was seen above the critical 0.75 voltage level when MMT was introduced into the air stream of the engine. The knock event reduction was achieved chemically without torque loss or power loss. In fact, a torque improvement was observed during the test. The observed torque improvement was 1.17%.

TABLE 4

Knock severity in the 4.6 L Ford V8

| voltage limit | w/o | with MMT | % reduction |
|---|---|---|---|
| 0.65 | 586 | 586 | 0% |
| 0.70 | 548 | 487 | 11% |

TABLE 4-continued

Knock severity in the 4.6 L Ford V8

| voltage limit | w/o | with MMT | % reduction |
|---|---|---|---|
| 0.75 | 322 | 83 | 74% |
| 0.80 | 107 | 15 | 86% |
| 0.85 | 45 | 10 | 78% |
| 0.90 | 30 | 7 | 77% |
| 1.00 | 21 | 2 | 90% |
| 1.10 | 13 | 1 | 92% |
| 1.20 | 12 | 1 | 92% |
| 1.30 | 8 | 0 | 100% |

Example 5

Figure 4:
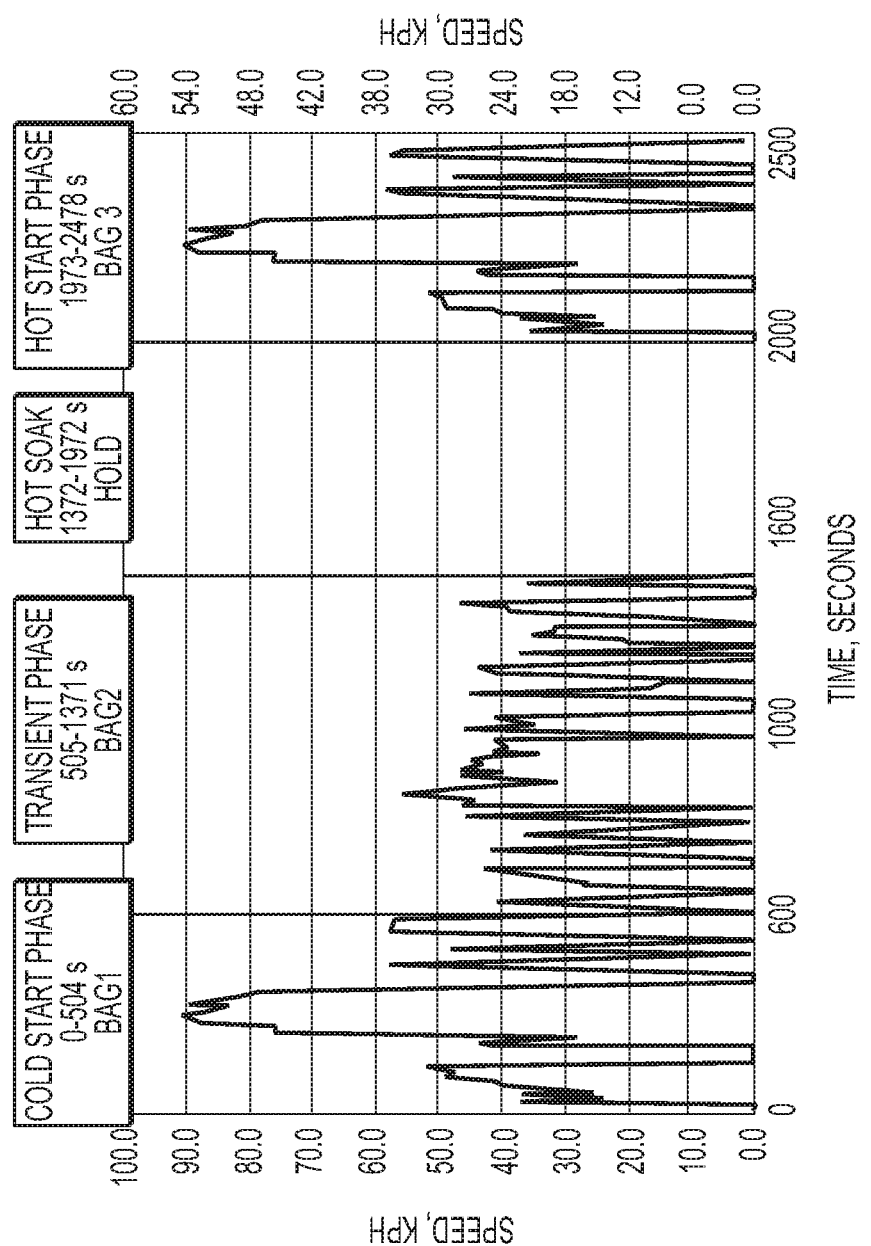

A 2011 Hyundai Accent was equipped with a 1.6-L, 4-cylinder, port-fuel-injected, gasoline engine with naturally throttled aspiration. Testing consisted of US EPA FTP-75 and HwFET driving cycles, which are depicted in FIGS. 4 and 5. Tailpipe emissions were measured during the testing, and carbon-balance was used to determine the fuel consumption. The vehicle was fully warmed before testing (coast-downs and a single throw-away run) and thus Bags 1 and 2 of the USA EPA FTP-75 cycles were collected in a warmed vehicle. The US EPA HwFET cycle was run after collecting Bags 1 and 2 of the USA EPA FTP-75 cycles. The fuel was a Colonial Pipeline E10. The oil was a commercial Pennzoil meeting the ILSAC GF-5 quality level and the SAE 5W-20 viscosity grade. It was flushed in two times before testing. There was no mileage accumulation. Standardized engineering practices were employed throughout the experiment. Duplicate tests were run without additive and these were followed by individual runs of additive at two levels. The additive was a 50% solution of friction reducer in Aromatic 100 solvent. It was fed to the vehicle via the syringe pump and nebulizer described previously. Air flow into the nebulizer was set at 4 SLPM at 60 psig. During experiments without friction reducer, the air flow was maintained at 4 SLPM, as a control. Table IV shows the shows the results for each of the miles-per-gallon determinations.

TABLE 5

Fuel Economy Measured in the 2011 Hyundai Accent, 1.6-L I-4.

| Test Cycle | Without Friction Modifier (average of 2 runs) | | | With Airborne Feed of 24.05 mg/min HiTec ® 6457 | | With Airborne Feed of 119.9 mg/min HiTec ® 6457 | |
|---|---|---|---|---|---|---|---|
| | mpg | StDev | COV | mpg | % FEI | mpg | % FEI |
| FTP Phase 1 | 34.433 | 0.288 | 0.84% | 34.601 | 0.49% | 34.579 | 0.43% |
| FTP Phase 2 | 30.884 | 0.044 | 0.14% | 30.961 | 0.25% | 31.099 | 0.70% |
| HwFET | 46.061 | 0.045 | 0.10% | 46.283 | 0.48% | 46.37 | 0.67% |

A modest fuel-economy improvement that increases with the dose of additive was seen in this test.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meanings of the terms in which the appended claims are expressed.

What is claimed is:

1. A method for improving fuel economy of a diesel engine by introducing at least one additive to a combustion chamber of the diesel engine through the diesel engine's air-intake system, said method comprising the steps of:
   determining an amount, an aerosol particle size and/or timing of addition of said additive based on information selected from type of fuel, upcoming road conditions, cetane number, air-fuel ratio, elevation, oil pressure, wheel speed, oxygen content of air, manifold vacuum pressure, driver characteristics, valve timing, hybrid powertrain strategy, technician input and any combination thereof,
   wherein said additive is a liquid selected from the group consisting of a combustion improver, scavenger, friction modifier, friction reducer, ignition retarder, ignition accelerator, acid neutralizer, corrosion inhibitor, anti-settling agent, cloud point reducer, anti-wear agent, biocide, demulsifier, antifoam additive, and peroxide, and any combination thereof;
   controlling the amount, the aerosol particle size, and/or the timing of the addition of said additive based on said determining step;
   introducing said additive with the controlled amount, timing of addition and/or aerosol particle size into said air-intake system of the diesel engine to produce an air-additive mixture;
   introducing said air-additive mixture to the combustion chamber;
   introducing diesel fuel to the combustion chamber; and combusting said diesel fuel in the combustion chamber;
   wherein said method provides an improvement in the fuel economy of the diesel engine.

2. The method of claim 1, wherein at least one said additive is a combustion improver.

3. The method of claim 2, wherein the combustion improver is selected from rare earth oxides, organic nitrates, and organometallic additives based on titanium, molybdenum, manganese, tungsten, platinum, palladium, cerium, zirconium, and tin.

4. The method of claim 3, wherein said rare earth oxide is selected from cerium oxide, MMT, oxygenates and like materials.

5. The method of claim 1, wherein at least one said additive is an ignition accelerant.

6. The method of claim 5, wherein said ignition accelerant is selected from acetone, alcohol, organic nitrates and peroxides.

7. A method for improving fuel economy of a diesel engine by introducing at least one additive to a combustion chamber of the diesel engine through the diesel engine's air-intake system, said method comprising the steps of:
   determining an amount, an aerosol particle size and/or timing of addition of said additive based on information selected from type of fuel, upcoming road conditions, cetane number, air-fuel ratio, elevation, oil pressure, wheel speed, oxygen content of air, manifold vacuum pressure, driver characteristics, valve timing, hybrid powertrain strategy, technician input and any combination thereof,
   wherein said additive is an ignition accelerant selected from acetone, alcohol, organic nitrates and peroxides;
   controlling the amount, the aerosol particle size, and/or the timing of the addition of said additive based on said determining step;
   introducing said additive with the controlled amount, timing of addition and/or aerosol particle size into said air-intake system of the diesel engine to produce an air-additive mixture;
   introducing said air-additive mixture to the combustion chamber;
   introducing diesel fuel to the combustion chamber; and combusting said diesel fuel in the combustion chamber;
   wherein said method provides an improvement in the fuel economy of the diesel engine.

8. The method of claim 1, wherein said introducing step comprises spraying said at least one additive as a mist suitable to be carried by airflow in the air intake system to the combustion chamber.

9. The method of claim 1, wherein said additive comprises an aerosol particle size sufficiently small to ensure that substantially all of the additive remains in the fuel/air-additive mixture in the combustion chamber.

10. The method of claim 1, wherein said additive comprises an aerosol particle size sufficiently large to ensure that at least a portion of the additive contacts at least one internal surface of the combustion chamber.

11. The method of claim 1, wherein said introducing step comprises introducing said additive into the positive crank ventilation line of said engine.

12. The method of claim 1, wherein said additive comprises a plurality of additives.

13. The method of claim 1, wherein the additive is a reactive species that is capable of undergoing a chemical reaction with one or more components of the diesel fuel when said additive is contacted with the diesel fuel.

14. The method of claim 1, wherein a user of the engine determines the timing of additive introduction to the air intake system.

15. The method of claim 1, wherein the additive is periodically introduced to the air intake system.

16. A system for improving fuel economy of a diesel engine by introducing at least one additive to an air intake system of the diesel engine, said system comprising:
   at least one container housing;
   one or more data information gathering devices to obtain information related to type of fuel, upcoming road conditions, cetane number, air-fuel ratio, elevation, oil pressure, wheel speed, oxygen content of air, manifold vacuum pressure, driver characteristics, valve timing, hybrid powertrain strategy, technician input and any combination thereof;
   a control system to regulate an amount, an aerosol particle size, and/or a timing of the addition of said additive based on information obtained by the one or more data gathering devices; and
   a device to introduce said additive into the air-intake system of the diesel engine responsive to said control system,
   wherein said additive is a liquid selected from the group consisting of a combustion improver, scavenger, friction modifier, friction reducer, ignition retarder, ignition accelerator, acid neutralizer, corrosion inhibitor, anti-settling agent, cloud point reducer, anti-wear agent, biocide, demulsifier, antifoam additive, and peroxide, and any combination thereof, and said system provides an improvement in the fuel economy of the diesel engine.

17. The system of claim 16, wherein said additive is a combustion improver.

18. The system of claim 17, wherein said combustion improver is selected from rare earth oxides, organic nitrates, and organometallic additives based on titanium, molybdenum, manganese, tungsten, platinum, palladium, cerium, zirconium, and tin.

19. The system of claim 18, wherein the rare earth oxide is selected from cerium oxide, MMT, oxygenates and like materials.

20. The method of claim 7, wherein said an ignition accelerant is introduced to improve a cetane number of a diesel fuel to be combusted in the combustion chamber.

* * * * *